(12) United States Patent
Baumgarten et al.

(10) Patent No.: US 9,125,344 B2
(45) Date of Patent: Sep. 8, 2015

(54) ASSISTANCE SYSTEM FOR OPTIMIZING VEHICLE OPERATION

(71) Applicant: CLAAS SELBSTFAHRENDE ERNTEMASCHINEN GMBH, Harsewinkel (DE)

(72) Inventors: Joachim Baumgarten, Beelen (DE); Andreas Wilken, Bissendorf (DE); Christoph Heitmann, Warendorf (DE); Sebastian Neu, Bad Laer (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 14/070,853

(22) Filed: Nov. 4, 2013

(65) Prior Publication Data

US 2014/0129048 A1    May 8, 2014

(30) Foreign Application Priority Data

Nov. 5, 2012 (DE) .......................... 10 2012 021 469

(51) Int. Cl.
| | |
|---|---|
| *A01D 41/127* | (2006.01) |
| *G06Q 10/04* | (2012.01) |
| *G06Q 30/02* | (2012.01) |
| *G06Q 50/02* | (2012.01) |

(52) U.S. Cl.
CPC .............. *A01D 41/127* (2013.01); *G06Q 10/04* (2013.01); *G06Q 30/0283* (2013.01); *G06Q 50/02* (2013.01)

(58) Field of Classification Search
CPC . A01D 41/127; G06Q 10/04; G06Q 30/0283; G06Q 50/02
See application file for complete search history.

(56) References Cited

U.S. PATENT DOCUMENTS

| | | | |
|---|---|---|---|
| 8,406,964 B2 | 3/2013 | Baumgarten et al. | |
| 2003/0066277 A1 | 4/2003 | Behnke | |
| 2005/0241285 A1* | 11/2005 | Maertens et al. ................... | 56/1 |
| 2009/0088932 A1* | 4/2009 | Diekhans et al. ............... | 701/50 |
| 2009/0312920 A1* | 12/2009 | Boenig et al. ................... | 701/50 |
| 2012/0004812 A1* | 1/2012 | Baumgarten et al. ........... | 701/50 |

FOREIGN PATENT DOCUMENTS

| | | |
|---|---|---|
| DE | 101 47 733 | 4/2003 |
| EP | 1 321 024 | 6/2003 |
| EP | 2 220 926 | 8/2010 |

* cited by examiner

*Primary Examiner* — Michael J Zanelli
(74) *Attorney, Agent, or Firm* — Michael J. Striker (57) ABSTRACT

An assistance system that optimizes the operation of a self-propelled agricultural working machine includes a device for determining working and efficiency parameters of the machine includes an arithmetic logic unit and a display unit. The arithmetic logic unit processes information generated by machine-internal sensor systems, external information and information stored in the arithmetic logic unit. One or more mathematical models describing the working process are stored in the arithmetic logic unit and derive efficiency parameters of the working machine from the available working parameters and, with consideration for monetary interrelationships, determine the opportunity costs of the working process and visualize the opportunity costs in the display unit.

19 Claims, 5 Drawing Sheets

ASSISTANCE SYSTEM FOR OPTIMIZING VEHICLE OPERATION

CROSS-REFERENCE TO A RELATED APPLICATION

The invention described and claimed hereinbelow is also described in German Priority Document DE 10 2012 021469.3, filed on Nov. 5, 2012. The German Priority Document, the subject matter of which is incorporated herein by reference, provides the basis for a claim of priority of invention under 35 U.S.C. 119(a)-(d).

BACKGROUND OF THE INVENTION

The invention relates to an assistance system for optimizing the operation of a self-propelled agricultural working machine.

Driver assistance systems are known. For example, German Patent Document DE 101 47 733 discloses a driver assistance system that supports the operator of an agricultural working machine in the optimization of the working parameters of the working parts. The driver assistance system comprises a complex display unit as well as an arithmetic logic unit for processing various sensor signals. The agricultural working machine, which is designed as a combine harvester, comprises a plurality of working parts, such as a header, a threshing mechanism, separating parts, and at least one cleaning mechanism, which are coupled to a plurality of sensing devices capable of detecting working parameters of the working parts as well as efficiency parameters of the agricultural working machine, such as grain loss, grain quality, and tailings quantity.

The information that is ascertainable by the sensing devices is forwarded to the central arithmetic logic unit, which derives information from these signals that can be visualized in the display unit. The visualized information comprises working parameters of the agricultural working machine, such as cylinder speed, cleaning fan speed, crop material throughput, and concave width, as well as efficiency parameters such as the grain losses of the cleaning and separating mechanisms. For the purpose of optimizing the various working parameters, German Patent document DE 101 47 733 proposes a method in which, in a first method step, the operator guides the agricultural working machine through the stand to be harvested at a ground speed that is appropriate for the expected crop throughput, thereby ensuring that the combine harvester is acted upon by an approximately consistent quantity of crop within a certain time period.

The operator must now wait until the combine harvester has reached a state of equilibrium in which an approximately consistent, good or poor working result is attained. This working result is recorded, and it is visualized to the operator in the display unit. If the working result is unsatisfactory, the operator of the combine harvester modifies a promising working parameter of a working part several times and, each time, waits for the combine harvester to reach a state of equilibrium with the modified working parameter. All the working result profiles are recorded, thereby allowing the operator to identify the specific value of the working parameter at which the best working result was attained. This specific value is then used to adjust the related working part, thereby ensuring that an improved working result of the agricultural working machine is ultimately attained.

A method of this type has a main disadvantage that a relatively long period of time must pass before the various working parameters of the combine harvester function within an optimized parameter range, since the disclosed adjustment procedure must be implemented for every working parameter. In addition, in the case of an adjustment method structured in this manner, rapid and successful optimization is decisively dependent upon the level of knowledge of the operator of the agricultural working machine, since the various working parameters influence one another via highly complex interactions.

European Patent document EP 2 220 926 discloses a driver assistance system that brings about an optimal adjustment of the working machine without the need for the operator of the working machine to intervene directly in the optimization process, yet that keeps the operator permanently informed of the optimization procedures being implemented. A driver assistance system structured in this manner makes it possible to quickly set optimal machine parameters, thereby ensuring that the efficiency parameters related to crop loss always move within an optimal range.

European Patent document EP 1 321 024 discloses a method for optimizing the operation of a self-propelled agricultural working machine that optimizes the efficiency parameters of the agricultural working machine and ascertains economic parameters of the agricultural working machine, such as fuel costs and the costs of grain losses, related to the on-going operation. Although such a system is capable of operating the agricultural working machine for defined machine parameters in a throughput range that has been optimized with respect to operating costs, such a method is not capable of optimizing the operation of the agricultural working machine depending on actual operating costs in such a way that the machine parameters are optimized depending on the operating costs.

SUMMARY OF THE INVENTION

The present invention overcomes the shortcomings of known arts, such as those mentioned above.

To that end, the present invention provides a method of providing a driver assistance system for optimizing the efficiency of an agricultural working machine which ensures that the agricultural working machine reaches an operating state that is optimized in terms of operating costs within the shortest amount of time possible.

The inventive assistance system comprises at least one control/regulating unit, which includes an arithmetic logic unit and a display unit, and one or more mathematical models that describe the working process of the agricultural working machine are stored in the arithmetic logic unit. The mathematical model or models derive efficiency parameters of the working machine from the available working parameters and, with consideration for monetary interrelationships, determine the opportunity costs of the working process, and wherein the opportunity costs are visualized in the display device. The invention thereby ensures that a function of the agricultural working machine that is optimized in terms of operating costs is made possible within the shortest period of time possible.

In an embodiment, the assistance system according to the invention is used in a highly flexible manner when the opportunity costs are determined in the on-going working process and/or as a simulation before the working process is implemented.

In order to ensure that the opportunity costs to be determined can be precisely analyzed, the working process is subdivided into partial working processes, and, for each partial working process, the partial opportunity costs and the opportunity costs calculated on the basis of the partial opportunity costs are determined and visualized.

Given that the assistance system proposes optimized working parameters with consideration for the partial opportunity costs and/or total opportunity costs that are determined, the inventive operation also ensures that the operator is relieved of performing specific analyses of the opportunity costs and that the costs associated with the agricultural working machine are quickly optimized.

The optimization of the opportunity costs becomes that much more effective the greater the amount of information is that is used to optimize the opportunity costs. Therefore, the stored mathematical models account for historical and/or current working parameters of the agricultural working machine.

A highly flexible use of the assistance system according to the invention results when the assistance system can be used on the agricultural working system and in a stationary device. The cost optimization can then be performed during on-line operation or in advance, in the form of a simulation.

A particularly great monetary effect is achieved with the assistance system according to the invention when the agricultural working machine is designed as a combine harvester and the working process described by the mathematical model or models is the harvesting process.

The quality of the opportunity costs to be determined also is increased in that the working parameters comprise setting parameters of the agricultural working machine and the crop throughput. In the agricultural context, the quality of the opportunity costs also is increased when the agricultural working machine is designed as a combine harvester and the efficiency parameters comprise at least one or more of the efficiency parameters "loss due to separation", "loss due to cleaning", "cleanliness of the grain", "non-threshed out components in the grain tank", "damaged grain" and "fuel consumption".

Given that one or more of the parameters "price of the crop to be harvested"; "fuel price"; "yield of the harvested crop" and the "rate of work by the agricultural working machine" is taken into account in the description of the monetary interrelationships, the opportunity costs can be easily derived from the efficiency parameters that are determined.

A particularly informative representation of the opportunity costs that are determined results in an advantageous embodiment of the invention when the efficiency parameters, at the least, are determined and then visualized in the mathematical model or models with consideration for the parameters describing the monetary interrelationships, the partial opportunity costs and/or the total opportunity costs "loss due to separation in units of cost/time or area", "loss due to cleaning in units of cost/time or area", "cleanliness of the grain in units of cost/time or area", "damaged grain in units of cost/time or area", "non-threshed out components in the grain tank in units of cost/time or area" and "fuel consumption in units of cost/time or area".

A good assessment of the working process of the agricultural working machine results when the partial opportunity costs that are determined are combined to form opportunity costs that describe the entire working process. The opportunity costs that are determined are particularly informative when the partial opportunity costs and/or the opportunity costs describing the entire working process are visualized in costs per hour or costs per area worked.

A further improvement of the opportunity costs to be determined is achieved when the mathematical model or models account for use-specific basic conditions of the working process. The ratio of remaining area to be worked and the possible rate of work of the agricultural working machine that is used is particularly significant. Therefore, a use-specific basic condition is the ratio of area to be worked and the possible rate of work of the working machine, wherein a large area to be worked relative to the possible rate of work of the working machine results in a higher monetary valuation of the rate of work and, conversely, a small area to be worked relative to the possible rate of work of the working machine results in a lower monetary valuation of the rate of work relative to the remaining monetary valuation quantities.

In order to prevent weather-related crop losses, it is provided in this context that, if the remaining area to be worked is large and the weather forecast is poor, the rate of work receives a greater monetary valuation compared to the remaining monetary valuation quantities.

The accuracy of the opportunity costs to be determined is further increased if a monetary valuation of the maintenance costs is performed such that the cost risk of delayed or premature maintenance is estimated and accounted for in the determination of the opportunity costs.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
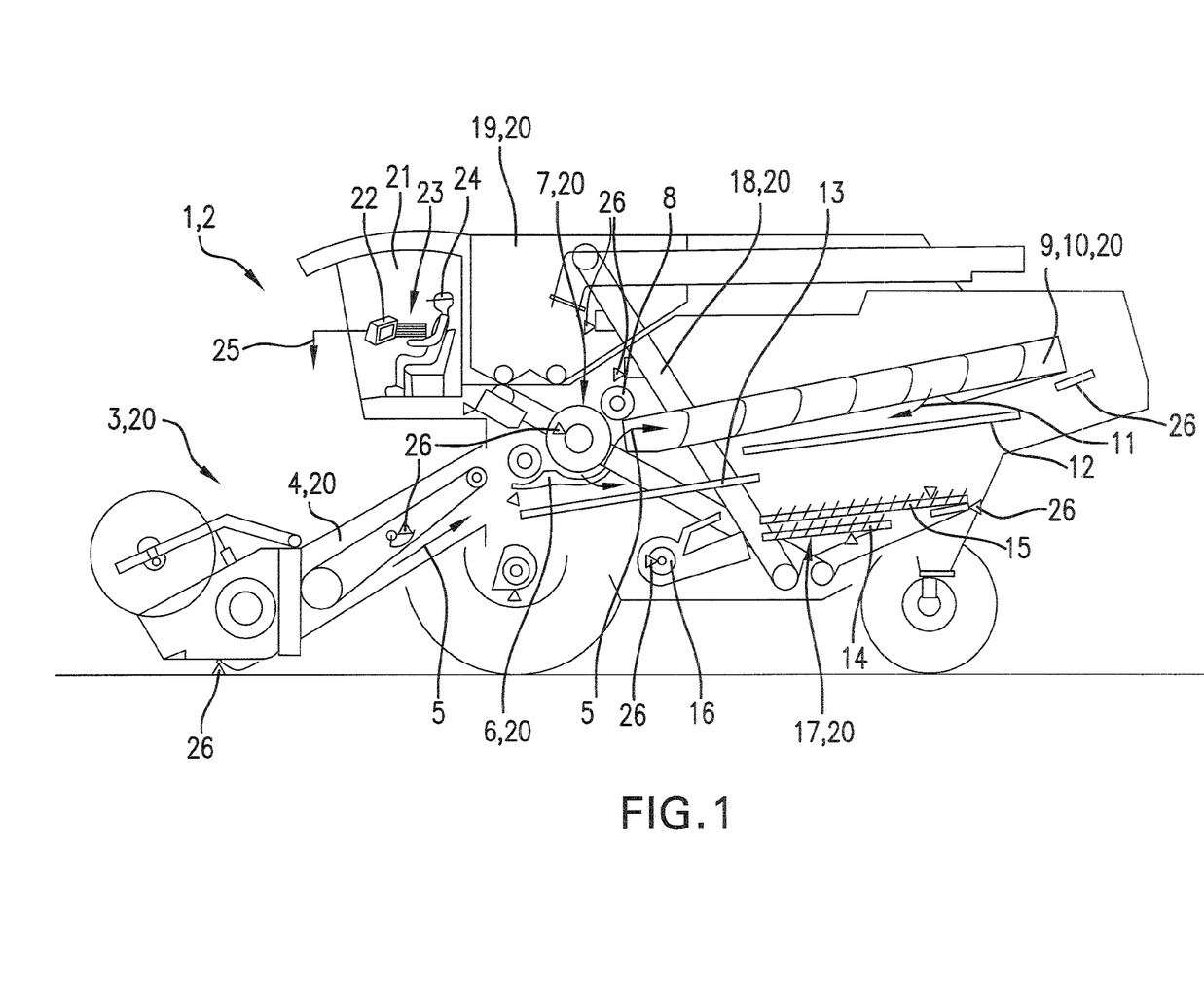
FIG. 1 presents a schematic representation of an agricultural working machine comprising an assistance system according to the invention.

The agricultural working machine 1 is designed as a combine harvester 2 and is depicted schematically in FIG. 1. The machine comprises a grain-cutting device 3 in the front region thereof, which is connected in a manner known per se to the feed rake 4 of the combine harvester 2. The crop stream 5 passing through the feed rake 4 is transferred in the upper, rear region of the feed rake 4 to the threshing parts 7 of the combine harvester 2, which are at least partially enclosed on the underside by the concave 6. A guide drum 8 disposed downstream of the threshing parts 7 redirects the crop stream 5 emerging from the threshing parts 7 in the rear region of these threshing parts such that the crop stream is transferred directly to a separating device 10 designed as a separating rotor 9.

The crop stream 5 is conveyed in the rotating separating rotor 9 such that any unencumbered grains 11 contained in the crop stream 5 are separated out in the region underneath the separating rotor 9. The grains 11 that are separated out at the concave 6 and at the separating rotor 9 are directed via the return pan 12 and the feed pan 13 to a cleaning device 17, which comprises a plurality of sieve levels 14, 15, and a fan 16. The cleaned flow of grain is then transferred via elevators 18 to a grain tank 19. In the following, the grain-cutting device 3, the feed rake 4, the threshing parts 7 and the concave 6 assigned thereto, the separating device 10, the cleaning device 17, the elevators 18, and the grain tank 19 are referred to as the working parts 20 of the agricultural working machine 1.

The agricultural working machine 1 also comprises a driver's cab 21, in which at least one control/regulating unit 23 equipped with a display device 22 is disposed. The control/regulating 23 uses a plurality of processes, which are known per se and are therefore not described in greater detail. The processes are initiated automatically or by the operator 24 of the agricultural working machine 1. The control/regulating unit 23 communicates via a bus system 25 in a manner known per se with a large number of sensor systems 26. The structure of the sensor systems 26 is described in detail in German Patent document DE 101 47 733, the entire contents of which are hereby incorporated in the disclosure of this patent application. Hence, the structure of sensor systems 26 is not described herein.

Figure 2A:
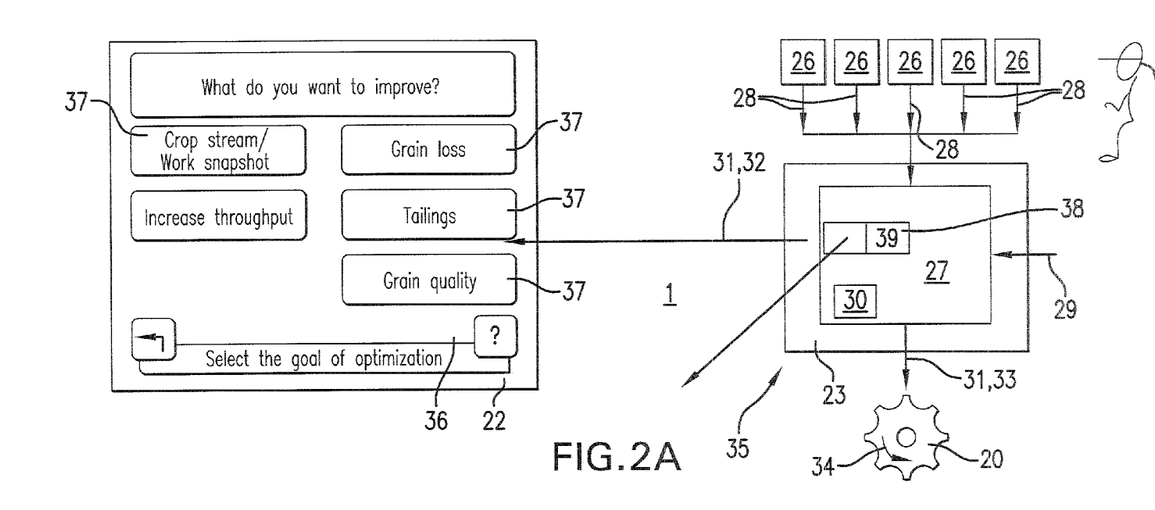
FIG. 2A is a schematic detailed view of the assistance system according to the invention.

FIG. 2A is a schematic representation of the display unit 22 of the control/regulating device 23, and the arithmetic logic unit 27 which is assigned to the control/regulating device 23 and is coupled to the display unit 22. The arithmetic logic unit 27 is designed to process information generated by the sensor systems 26, as well as external information 29, and information 30 stored in the arithmetic logic unit 27 itself, such as expert knowledge, in order to obtain a large number of output signals 31. The output signals 31 are designed to include, at the least, display control signals 32 and working part signals 33. The display control signals determine the content of the display unit 22 and the working part signals initiate the change of the highly diverse working parameters 34 of the working parts 20 of the agricultural working machine 1; the arrow 34 symbolizes the cylinder speed.

The control/regulating unit 23, including the display unit 22 and the arithmetic logic unit 27 assigned thereto, are components of the driver assistance system 35. The display unit 22 thereof enables interactive, natural-language communication to take place between the operator 24 and the driver assistance system 35 in a display area 36. The driver assistance system 35 is designed to overcome or halt critical functions of the agricultural working machine 1, while accounting for at least a selection of information 28-30 available in the arithmetic logic unit 27, by optimizing one or more efficiency parameters 37 of the agricultural working machine 1 (preferably by means of interactive, natural-language communication).

Figure 2B:
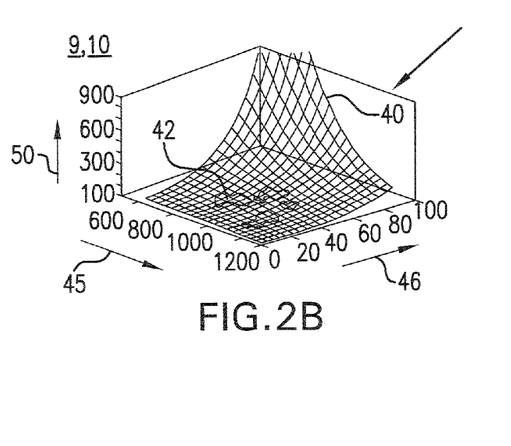
FIG. 2B is a program map describing an aspect of a working process, i.e., separating process, of the agricultural working machine.

In order to ensure that the function of an agricultural working machine 1 designed as a combine harvester 2 can be optimized, the arithmetic logic unit 27 comprises a software module 38, in a manner known per se, in which one or more mathematical models 39 are stored. The mathematical models 39 are used to depict and optimize the working process of the agricultural working machine. The mathematical models 39 are initially created in a manner known per se, such that these permit optimization of the working and efficiency parameters 34, 37. The description of the working process of the agricultural working machine 1 is illustrated by reference to a program map 40, as shown in FIG. 2B, describes the separating process of the separating device 10 designed as a separating rotor 9.

Figure 2C:
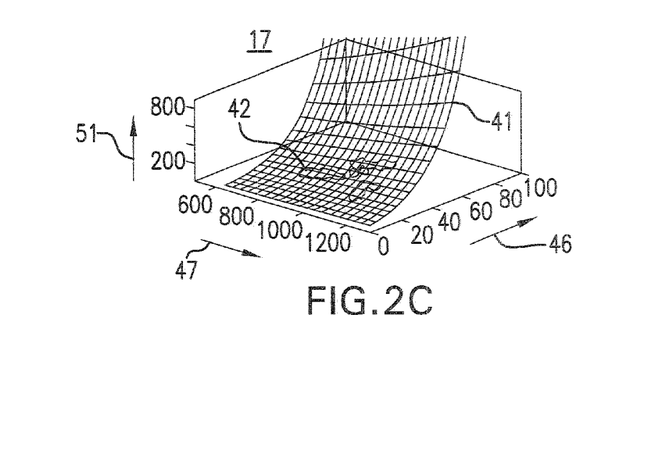
FIG. 2C is a program map describing an aspect of a working process, i.e., cleaning device process, of the agricultural working machine.

The separating process described by the program map 40 comprises, for example, the sensor-detected losses due to separation 50 as the output quantity depending on the working parameter 34 "separating rotor speed" 45 and a throughput-dependent quantity such as the sensor-detected layer thickness 46 in the feed rake 4. Similarly, the description of the working process of the agricultural working machine 1 designed as a combine harvester 2 also may comprise the function of a cleaning device 17. A program map 41, as shown in FIG. 2C, describes the working process of the cleaning device 17, comprises, for example, the sensor-detected losses due to cleaning the output quantity depending on the working parameter 34 "cleaning fan speed" 47 and a throughput-dependent quantity such as the sensor-detected layer thickness 46 in the feed rake 4. It lies within the scope of the invention for the software module 38 to comprise a plurality of program maps that describe the working process of an agricultural working machine 1. The description of the working process of the threshing mechanism 6, 7 of an agricultural working machine 1 designed as a combine harvester 2 also is described, as an example.

In order to reach the goal of a balanced setting of separation and cleaning, both program maps 40, 41 are used in a manner known per se to determine an optimum working point 42 of the rotor speed 34 on the basis of the separating and cleaning program maps 40, 41, i.e., a common working point 42, at which the losses in the separating device 10 and the cleaning device 17 are minimized under the currently prevailing harvesting conditions.

Figure 3:
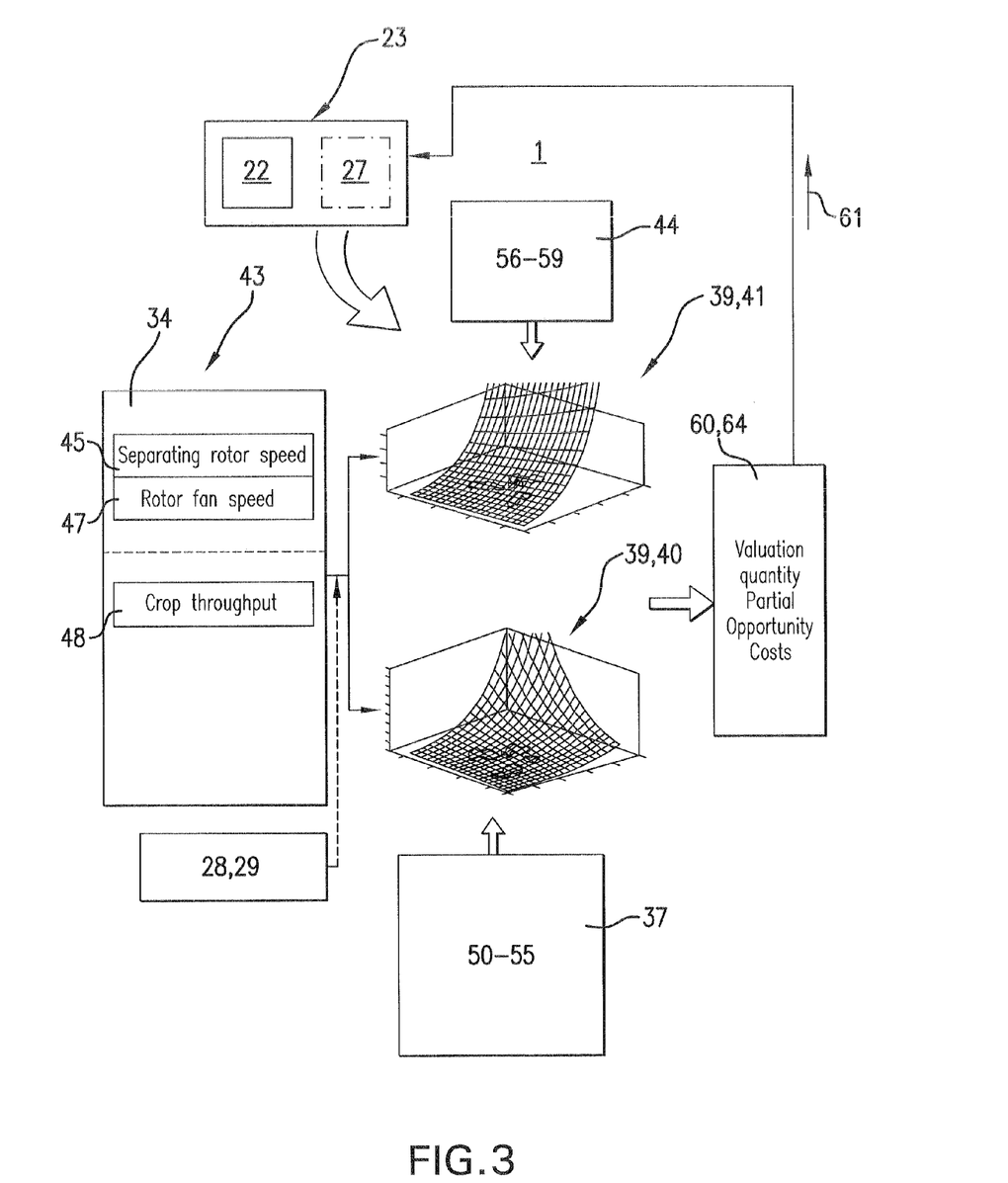
FIG. 3 presents a further detailed view of the assistance system according to the invention.

Aspects of the assistance system 35 described in FIG. 2A are depicted in FIG. 3, as an example. One or more mathematical models 39 describing the working process of the agricultural working machine 1 are stored in the arithmetic logic unit 27 associated with the control/regulating device 23. As stated above, the stored mathematical models 39 comprise, at the least, a program map 41 for describing the working process of the separating device 10 and a program map 40 for describing the working process of the cleaning device 17. Input quantities 43 of the mathematical models 39 generating the particular program maps 40, 41 are machine-related working parameters 34, such as the speed 45, 47 of certain working parts 20, and crop-related working parameters 34, such as crop throughput 48, the moisture content of the straw and grain, and humidity. With consideration for these working parameters 34 and, possibly, other external and internal information 28, 29, the stored mathematical models 39 first generate the efficiency parameters 37.

Where the agricultural working machine 1 is designed as a combine harvester 2, the efficiency parameters 37 can comprise, for example, one or more of the efficiency parameters 37 "loss due to separation" 50, "loss due to cleaning" 51, "cleanliness of the grain" 52, "non-threshold out components in the grain tank" 53, "damaged grain" 54 and "fuel consumption" 55. The stored mathematical interrelationships 39 also account for so-called monetary interrelationships 44, wherein the monetary interrelationships 44 can comprise one or more of the parameters "price of the crop to be harvested" 56; "fuel price" 57; "yield of the harvested crop" 58 and the "rate of work of the agricultural working machine" 59. Also, valuation quantities 60 in the form of so-called opportunity costs 61 are then determined from the ascertained efficiency parameters 37 with consideration for the available monetary interrelationships 44, and these valuation quantities are visualized in the display unit 22 associated with the control/regulating device 23.

If one considers only the aforementioned efficiency parameters 37 in the optimization of the working process of the agricultural working machine 1 designed as a combine harvester 2, then efficient function always results when the quantity of grain conveyed out of the machine by the separating device 10 and the cleaning device 17 (namely the so-called losses due to separation 50 and the loss due to cleaning 51), are low but the cleanliness of the grain 52 is high, the non-threshed out components 53 separated by the cleaning device 17 and conveyed into the grain tank 19 are low, the threshing parts 7 cause only a slight amount of damaged grain 54, and low fuel consumption 55 is achieved.

With respect to the above-described monetary interrelationships 44, it does apply that, independently of the actual costs, the monetary valuation of the working process of the agricultural working machine 1 is positively affected when fuel consumption is low, crop losses are low and, correspondingly, quantities of grain actually harvested are high, and the portion of damaged grain is low. Due to the fact that the costs of fuel per liter or ton differ from the costs of grain per liter or ton, a cost-effective working process of the agricultural working machine is decisively dependent on the costs of fuel and the crop to be harvested, and can be subject to constant fluctuations. Therefore, determining the effect of the individual parameters 37 on the opportunity costs 61 is particularly significant in terms of determining a cost-effective working process of the agricultural working machine 1. In this context, it may be significant that the current fuel and grain prices are continuously acquired via data bases that are available on-line.

Figures 4A, 4B:
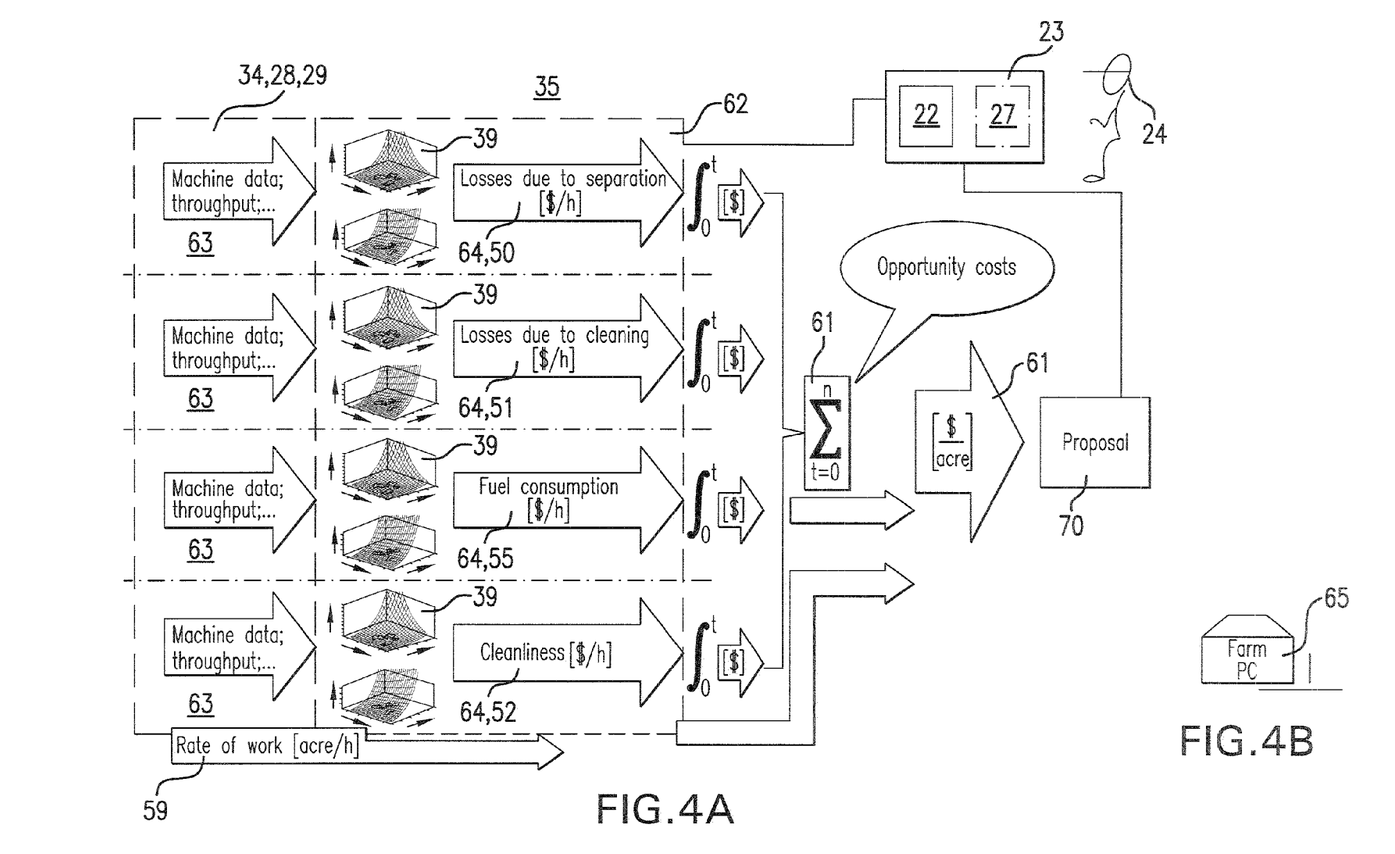
FIG. 4A presents an alternative embodiment of the assistance system according to the invention.
FIG. 4B presents a stationary device or farm PC to which the assistance system 35 of FIG. 4A may be assigned.

According to FIG. 4A, the assistance system 35 is therefore designed such that the working process 62 of the agricultural working machine 1 is subdivided into partial working processes 63. The partial working processes 63 can comprise the grain losses 50, 51 in the separating and cleaning devices 10, 17, the fuel consumption 55 and the cleanliness of the grain 52. The mathematical models 39 stored in the arithmetic logic unit 27 each first generate partial opportunity costs 64, for example, in costs per hour, which can be visualized in the display unit 22 of the control/regulating unit 23, thereby providing the operator 24 with an overview of the partial opportunity costs 64.

Also, summing the partial opportunity costs 64 gives the total opportunity costs 61 of the working process 62 of the agricultural working machine 1. If the partial opportunity costs 64 or the total opportunity costs 61 are then set in relation to the rate of work 59 of the agricultural working machine 1, the result is the opportunity costs 61 based on an area, which is an acre in this case. Consequently, it is possible to use the stored mathematical models 39 to determine, on the basis of the efficiency parameters 37, at the least, with consideration for the parameters 56-59 (FIG. 3) describing the monetary interrelationships 44, and visualize the partial opportunity costs 64 and/or the total opportunity costs 61 "grain loss due to separation in units of cost/time or area", "grain loss due to cleaning in units of cost/time or area", "cleanliness of the grain in units of cost/time or area", "damaged grain in units of cost/time or area", "non-threshed out components in the grain tank in units of cost/time or area", and "fuel consumption in units of cost/time or area".

It lies within the scope of the invention for the determined opportunity costs 61, 64 to be continuously determined either before the start of the working process 62 of the agricultural working machine 1 in the form of a simulation, or in the on-going working process 62. The stored mathematical models 39 account for historic and/or current working parameters 34 and additional internal and external information 28, 29 in the simulation and during on-line operation. In order to ensure that the assistance system 35 can be used for an advance simulation and in on-line operation, the assistance system 35 is directly assignable to the agricultural working machine 1. It is also feasible for the assistance system 35 to be assigned to a stationary device 65, such as a so-called farm PC (see FIG. 4B).

Although the assistance system 35 according to the invention in the example described herein relates to an agricultural working machine 1 designed as a combine harvester 2, and the working process 62 to be optimized is a harvesting process, the invention is not limited thereto. The agricultural working machine 1 can be designed as any type of agricultural working machine, such as a forage harvester or a tractor having an attachment, and can relate to a harvesting process as well as any working process 62 of an agricultural working machine 1. It follows that the opportunity costs 61, 64 can then be other than those mentioned herein, depending on the application. In addition, the assistance system 35 generates a proposal 70, with consideration for the opportunity costs 61, 64 that were determined, for adjusting at least the working parameters 34 of the agricultural working machine 1 and displays these in the display unit 22.

Figure 5:
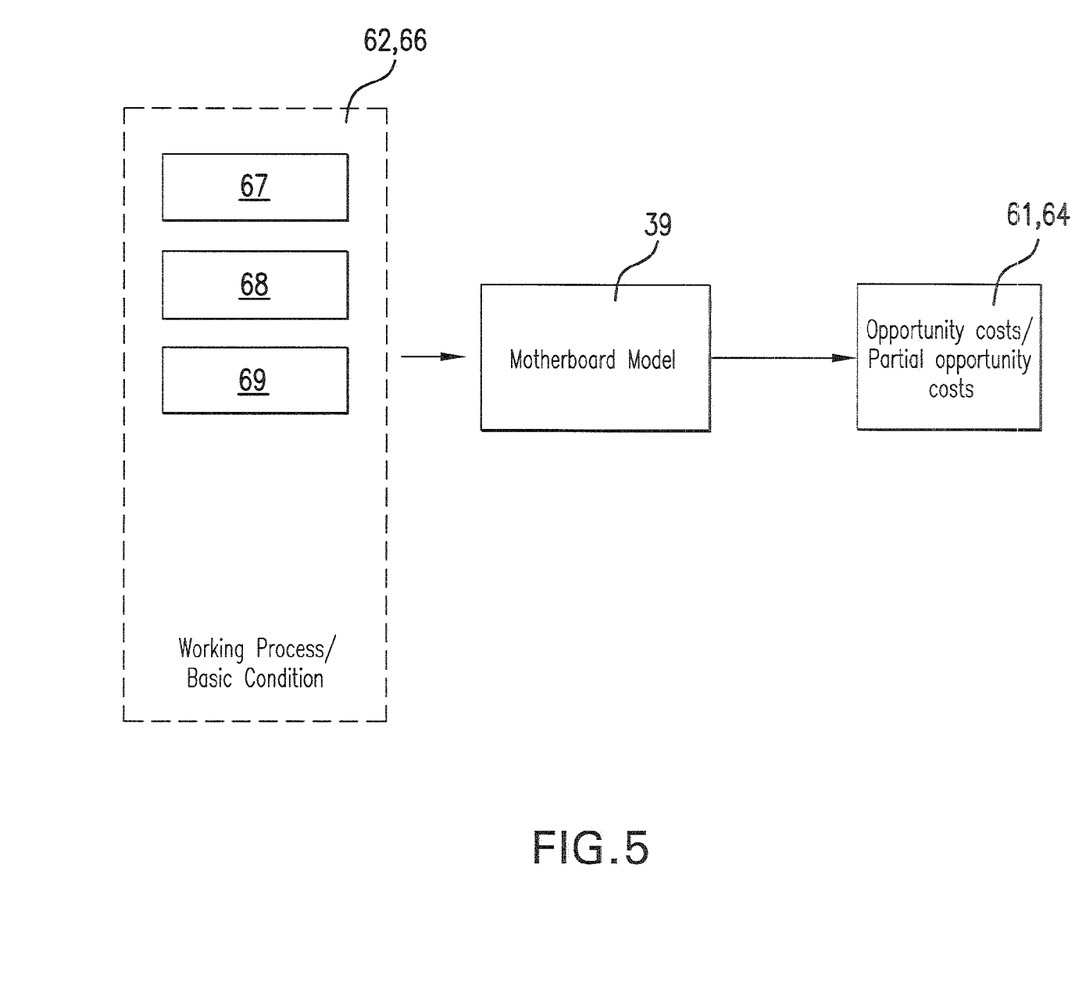
FIG. 5 shows an alternative embodiment of the assistance systems according to FIGS. 3, 4A and 4B.

According to FIG. 5, the mathematical models or models 39 can account for the above-described parameters as well as use-specific basic conditions 66 of the working process 62. A use-specific basic condition 66 can be the ratio 67 of remaining area to be worked and the possible rate of work of the working machine 1, wherein a large remaining area to be worked relative to the possible rate of work of the working machine 1 brings about a greater monetary valuation of the rate of work compared to the working parameters 34. Operating in manner ensures that the actual harvesting-time window that is available is used in an optimal manner and that losses due to breakage resulting from over-ripe grain, or cancelled harvesting operations due to periods of poor weather are reduced.

Similarly, a remaining area to be worked relative to the possible rate of work of the working machine 1 can bring about a low monetary valuation of the rate of work relative to the remaining monetary valuation quantities 44. In this case, the time window available for harvesting is correspondingly large, and therefore lower opportunity costs 61, 64 is achieved by effectively setting working parameters 34 and optimizing fuel consumption 55. If the remaining area to be worked is large and the weather forecast is poor 68, the rate of work compared to the remaining monetary valuation quantities 44 can receive a greater monetary valuation, since weather-related harvesting cancellations are partly responsible for considerable monetary losses.

A further basic condition 66 that must be accounted for can be the monetary valuation of the maintenance costs 69, wherein, in this case, the cost risk of delayed or premature maintenance is estimated and accounted for in the determination of the opportunity costs 61, 64. In the case of premature maintenance, the maintenance costs must be offset against a reduced machine output, while delayed maintenance typically results in additional costs when machine parts subject to wear fail, thereby causing damage.

LIST OF REFERENCE CHARACTERS 1 agricultural working machine
2 combine harvester
3 grain-cutting device
4 feed rake
5 crop stream
6 concave
7 threshing part
8 guide drum
9 separating rotor
10 separating device
11 grain
12 return pan
13 feed pan
14 sieve level
15 sieve level
16 fan
17 cleaning device
18 elevator
19 grain tank
20 working part
21 driver's cab
22 display unit
23 control/regulating unit
24 operator
25 bus system
26 sensor system
27 arithmetic logic unit
28 internal information
29 external information
30 information
31 output signal
32 display signal
33 working part signal
34 working parameter
35 assistance system
36 display region
37 efficiency parameter
38 software module
39 mathematical model
40 program map
41 program map
42 optimized working point
43 input quantity
44 monetary interrelationships
45 separating rotor speed
46 layer thickness
47 rotor fan speed
48 crop throughput
49 losses due to separation
50 losses due to separation
51 losses due to cleaning
52 cleanliness of the grain
53 non-threshed out components
54 damaged grain
55 fuel consumption
56 price of the crop to be harvested
57 fuel price
58 yield of the harvested crop
59 rate of work
60 valuation quantity
61 opportunity costs
62 working process
63 partial working process
64 partial opportunity costs
65 stationary device
66 basic condition
67 ratio of remaining area/machine output
68 poor-weather prediction
69 maintenance cost assessment
70 proposal As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An assistance system for optimizing the operation of a self-propelled agricultural working machine comprising a plurality of working parts and at least one device for determining working and efficiency parameters of the agricultural working machine configured with an arithmetic logic unit and at least one display unit,
    wherein the arithmetic logic unit processes information generated by machine-internal sensor systems, external information, and information stored in the arithmetic logic unit,
    wherein one or more mathematical models (39) describing the working process (62) of the agricultural working machine (1) are stored in the arithmetic logic unit (27),
    wherein the mathematical model or models (39) derive efficiency parameters (37) of the working machine (1) from the available working parameters (34) and, with consideration for monetary interrelationships (44), determine opportunity costs (61) of the working process (62), and subdivide the working process (62) into partial working processes (63),
    wherein for each partial working process (63), partial opportunity costs (64) and the opportunity costs (61) formed of the sum of the partial opportunity costs (64) are determined,
    wherein a proposal (70) for adjusting the available working parameters (34) with consideration of the opportunity costs (61), the partial opportunity costs (64) or both is generated,
    wherein the opportunity costs (61), the partial opportunity costs and the proposal (70) for adjusting the available working parameters (34) are visualized in the display unit (22), and
    wherein selecting the proposal (70) causes the available working parameters of the working machine to be adjusted with consideration of the opportunity costs, the partial opportunity costs or both.

2. The assistance system for optimizing the operation of a self-propelled agricultural working machine according to claim 1, wherein the opportunity costs (61) are determined in the on-going working process (62), as a simulation before the working process (62) is carried out or both.

3. The assistance system for optimizing the operation of a self-propelled agricultural working machine according to claim 1, wherein the working process (62) is subdivided into partial working processes (63) and, wherein for each partial working process (63), partial opportunity costs (64) and the opportunity costs (61) formed of the sum of the partial opportunity costs (64) are determined and visualized.

4. The assistance system for optimizing the operation of a self-propelled agricultural working machine according to claim 3, wherein the assistance system (35) proposes optimized working parameters (34) with consideration for the partial opportunity costs (64) and/or a total of opportunity costs (61) that were determined.

5. The assistance system for optimizing the operation of a self-propelled agricultural working machine according to claim 1, wherein the stored mathematical models (39) account for historic and/or current working parameters (34) of the agricultural working machine (1).

6. The assistance system for optimizing the operation of a self-propelled agricultural working machine according to claim 1, wherein the assistance system (35) is assigned to the agricultural working machine (1), to a stationary device (65) or to both.

7. The assistance system for optimizing the operation of a self-propelled agricultural working machine according to claim 1, wherein the agricultural working machine (1) is designed as a harvesting machine (2) and the working process (62) described by the mathematical model or models (39) is the harvesting process.

8. The assistance system for optimizing the operation of a self-propelled agricultural working machine according to claim 1, wherein the working parameters (34) comprise setting parameters of the agricultural working machine (1) and the crop throughput (48).

9. The assistance system for optimizing the operation of a self-propelled agricultural working machine according to claim 1, wherein the agricultural working machine (1) is designed as a combine harvester (2) and the efficiency parameters (37) comprise at least one or more of the efficiency parameters "loss due to separation" (50), "loss due to cleaning" (51), "cleanliness of the grain" (52), "non-threshed out components in the grain tank" (53), "damaged grain" (54) and "fuel consumption" (55).

10. The assistance system for optimizing the operation of a self-propelled agricultural working machine comprising a plurality of working parts according to claim 9, wherein the efficiency parameters (37), at the least, are determined and then visualized in the mathematical model or models (39) with consideration for the parameters describing the monetary interrelationships (44), partial opportunity costs (64) and/or a total of opportunity costs (61) "loss due to separation in units of cost/time or area", "loss due to cleaning in units of cost/time or area", "cleanliness of the grain in units of cost/time or area", "damaged grain in units of cost/time or area", "non-threshed out components in the grain tank in units of cost/time or area" and "fuel consumption in units of cost/time or area".

11. The assistance system for optimizing the operation of a self-propelled agricultural working machine according to claim 10, wherein the partial opportunity costs (64) that are determined are combined to form the opportunity costs (61) describing a total working process (62).

12. The assistance system for optimizing the operation of a self-propelled agricultural working machine according to claim 11, wherein the partial opportunity costs (64), a total of the opportunity costs (61) describing the total working process (62), or both are visualized in costs per hour or costs per area worked.

13. The assistance system for optimizing the operation of a self-propelled agricultural working machine according to claim 1, wherein one or more of the parameters "price of the crop to be harvested" (56); "fuel price" (57); "yield of the harvested crop" (58) and the "rate of work of the agricultural working machine" (59) are taken into account in the description of the monetary interrelationships (44).

14. An assistance system for optimizing the operation of a self-propelled agricultural working, machine comprising a plurality of working parts and at least one device for determining working and efficiency parameters of the agricultural working machine configured with an arithmetic logic unit and at least one display unit, wherein the arithmetic logic unit processes information generated by machine-internal sensor systems, external information, and information stored in the arithmetic logic unit, wherein one or more mathematical models (39) describing the working process (62) of the agricultural working machine (1) are stored in the arithmetic logic unit (27), wherein the mathematical model or models (39) derive efficiency parameters (37) of the working machine (1) from the available working parameters (34) and, with consideration for monetary interrelationships (44), determine opportunity costs (61) of the working process (62), wherein the agricultural working machine (1) is designed as a combine harvester (2) and the efficiency parameters (37) comprise at least one or more of the efficiency parameters "loss due to separation" (50), "loss due to cleaning" (51), "cleanliness of the grain" (52), "non-threshed out components in the grain tank" (53), "damaged grain" (54) and "fuel consumption" (55), wherein the efficiency parameters (37), at the least, are determined and then visualized in the mathematical model or models (39) with consideration for the parameters describing the monetary interrelationships (44), partial opportunity costs (64) and/or a total of opportunity costs (61), wherein a proposal (70) for adjusting the available working parameters (34) with consideration of the efficiency parameters (37), the partial opportunity costs (64) and/or the total opportunity costs (61) is generated, wherein the partial opportunity costs (64), the total opportunity costs (61) and the proposal (70) for adjusting the available working parameters (34) are visualized in the display unit (22), and wherein selecting the proposal (70) causes the available working parameters of the working machine to be adjusted with consideration of the opportunity costs, the partial opportunity costs or both.

15. The assistance system for optimizing the operation of a self-propelled agricultural working machine according to claim 14, wherein the mathematical model or models (39) account for use-specific basic conditions (66) of the working process (62).

16. The assistance system for optimizing the operation of a self-propelled agricultural working machine according to claim 15, wherein a use-specific basic condition (66) is the ratio (67) of area to be worked and possible rate of work of the working machine (1), wherein a large area to be worked relative to the possible rate of work (59) of the working machine (1) brings about a higher monetary valuation of the rate of work (59) and, conversely, a small area to be worked relative to the possible rate of work (59) of the working machine (1) brings about a lower monetary valuation of the rate of work (59) relative to the remaining monetary valuation quantities (44).

17. The assistance system for optimizing the operation of a self-propelled agricultural working machine according to claim 15, wherein, given a large remaining area to be worked and a poor-weather forecast (68), the rate of work (59) receives a higher monetary valuation than the remaining monetary valuation quantities (44).

18. The assistance system for optimizing the operation of a self-propelled agricultural working machine according to claim 15, wherein a monetary valuation of the maintenance costs (69) is performed such that the cost risk of delayed or premature maintenance is estimated and accounted for in the determination of the opportunity costs (61, 64).

19. An assistance system for optimizing the operation of a self-propelled agricultural working machine comprising a plurality of working parts and at least one device for determining working and efficiency parameters of the agricultural working machine configured with an arithmetic logic unit and at least one display unit,
- wherein the arithmetic logic unit processes information generated by machine-internal sensor systems, external information, and information stored in the arithmetic logic unit,
- wherein one or more mathematical models (39) describing the working process (62) of the agricultural working machine (1) are stored in the arithmetic logic unit (27),
- wherein the mathematical model or models (39) derive efficiency parameters (37) of the working machine (1) from the available working parameters (34) and, with consideration for monetary interrelationships (44), determine opportunity costs (61) and account for use-specific conditions (66) of the working process (62),
- wherein a use-specific basic condition (66) is the ratio (67) of area to be worked and possible rate of work of the working machine (1),
- wherein a large area to be worked relative to the possible rate of work (59) of the working machine (1) brings about a higher monetary valuation of the rate of work (59) and, conversely, a small area to be worked relative to the possible rate of work (59) of the working machine (1) brings about a lower monetary valuation of the rate of work (59) relative to the remaining monetary valuation quantities (44),
- wherein a proposal (70) for adjusting the available working parameters (34) with consideration of the opportunity costs (61) and use-specific conditions (66) is generated,
- wherein the opportunity costs (61), use-specific conditions (66) and the proposal (70) for adjusting the available working parameters (34) are visualized in the display unit (22), and
- wherein selecting the proposal (70) causes the available working parameters of the working machine to be adjusted with consideration of the opportunity costs and the use-specific conditions (66).

\* \* \* \* \*